Figure 1:
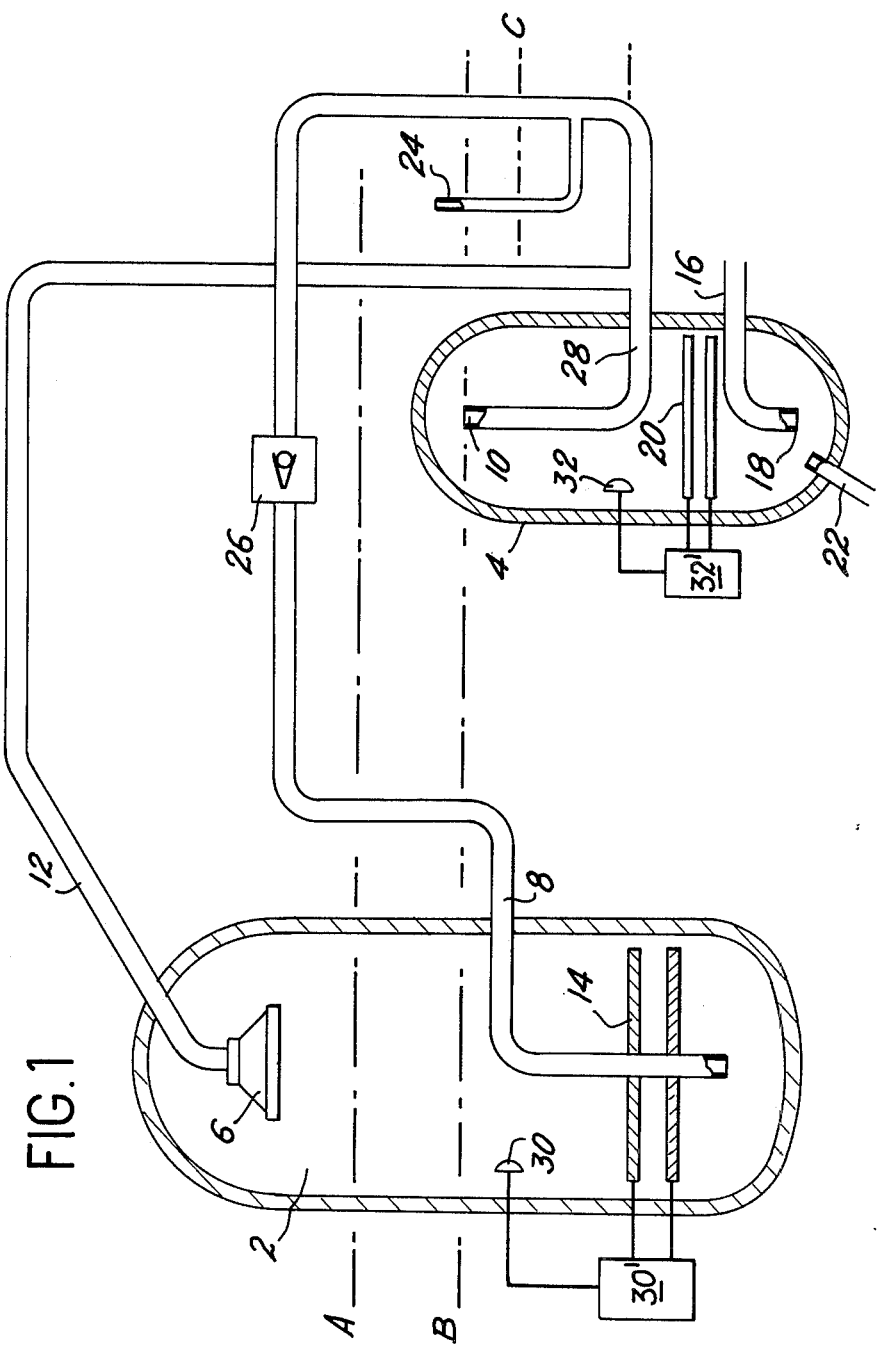

United States Patent [19]

Bonnet et al.

[11] 4,124,067
[45] Nov. 7, 1978

[54] PRESSURIZATION APPARATUS WITH AN INTERMEDIATE RESERVE VESSEL

[75] Inventors: Yves Bonnet, Versailles; Michel Mabile, Jouy-en-Josas, both of France

[73] Assignee: Commissariat a l'Energie Atomique, Paris, France

[21] Appl. No.: 746,589

[22] Filed: Dec. 1, 1976

[30] Foreign Application Priority Data

Dec. 9, 1975 [FR] France .................... 75 37627

[51] Int. Cl.² ............................................. F28D 15/00
[52] U.S. Cl. ........................... 165/107 D; 165/107 R; 176/65; 137/593; 138/30
[58] Field of Search ................ 165/107; 176/65; 138/30, 26; 137/207, 593

[56] References Cited

U.S. PATENT DOCUMENTS 3,245,463  4/1966  Benedict et al. ................. 165/107
3,417,815  12/1968  Van Den Honert ............... 165/107
3,722,578  3/1973  Frei et al. ..................... 165/107 X Primary Examiner—Albert W. Davis, Jr.
Attorney, Agent, or Firm—Lane, Aitken, Dunner & Ziems

[57] ABSTRACT

The invention relates to a pressurization apparatus with an intermediate reserve vessel.

This apparatus comprises a first enclosure or "pressurizer" having a sprinkler system located in the upper parts thereof and a first heating system and a second enclosure or "intermediate reserve vessel" having a second heating system, whereby a first pipe connects the base of said reserve vessel with the said reactor loop or vessel, while a second unidirectional pipe passes liquid from the lower part of said pressurizer towards the upper part of said reserve vessel and a third unidirectional pipe passes the said liquid from the upper part of the said reserve vessel to the said sprinkler system.

8 Claims, 4 Drawing Figures

PRESSURIZATION APPARATUS WITH AN INTERMEDIATE RESERVE VESSEL

The present invention relates to a pressurization apparatus with an intermediate reserve vessel.

More specifically, the invention relates to an apparatus of a particular type which makes it possible to maintain at a substantially constant level the pressure of the cooling fluid of a nuclear reactor in a given temperature range. It an even more specific manner, the present invention relates to an apparatus for regulating the pressure of the water used for the cooling and extraction of calories of a pressurized water nuclear reactor.

As is known in pressurized water reactors under rated operating conditions, the water is heated to a temperature of apporoximately 300° C. In order to maintain the water in liquid form at such a temperature with a sufficient safety margin, it is necessary to maintain the pressure of said water at a value of about 150 bars. However, the variations of the requisite power, that is to say the variations of the power taken at the outlet of the secondary circuit for supplying the turbines, lead to temperature variations in the case of the water in the primary circuit. These temperature variations and resulting volume variations may cause inadmissible pressure variations. In particular, the rise in pressure could lead to the undesired release of the safety valves and a drop in the pressure could lead to the water boiling in the reactor vessel.

In order to prevent such situations occurring, the primary cooling circuits are provided with at least one pressurizer which has the function of maintaining substantially constant the water pressure, whatever the requisite charge variation and therefore whatever the temperature variations and volume variations resulting therefrom.

The pressurizer is an expansion chamber making it possible to maintain the pressure substantially constant, despite these volume variations. In per se known manner, a steam pressurizer comprises a sealed tank, whose lower part is connected with the primary cooling circuit and which contains a certain volume of primary water in equilibrium with its steam. Under permanent operating conditions, it is sufficient to maintain this water at a temperature such that the corresponding saturated steam pressure is equal to the operating pressure of the nuclear reactor.

When there is a reduction in the quantity of heat released by the exchanges in the primary circuit, the water contained therein heats. The water contained in the primary circuit expands and enters the pressurizer in which the steam is further compressed. This is called the intrusion phenomena. Rather than increase the dimensions of the pressurizer to limit this pressure increase, it is preferable to cool the steam by means of a sprinkler.

However, when the requested charge increases, the primary circuit cools and the level in the pressurizer drops. This is called the extrusion phenomenon. The volume increase thus offered to the steam in the pressurizer leads to a pressure drop which is however, limited by the boiling of the water in the pressurizer. This water temperature drop is compensated in known manner by putting into operation a heating system within the pressurizer. The thermal cycle (a succession of extrusion and intrusions) despite a permanent saturation of primary water within the pressurizer, inevitably causes thermal stresses on the connecting members between vessel and pressurizer. Moreover, the presently known systems require in the case of an intrusion, the opening of a solenoid sprinkler valve which is a sensitive component and whose reliability is not optimum.

The problem of the present invention is a pressurization device having an intermediate reserve vessel which obviates the disadvantages mentioned hereinbefore, by more particularly reducing the effect of thermal cycles, whilst eliminating the released solenoid valve.

According to the invention, this problem is solved in that it comprises a first enclosure or "pressurizer" having a sprinkler system located in the upper parts thereof and a first heating system and a second enclosure or "intermediate reserve vessel" having a second heating system, whereby a first pipe connects the base of said reserve vessel with the said reactor loop or vessel, whilst a second unidirectional pipe passes liquid from the lower part of said pressurizer towards the upper part of said reserve vessel and a third unidirectional pipe passes the said liquid from the upper part of the said reserve vessel to the said sprinkler system. p The regulation of the heating system of the first enclosure or pressurizer depends on the value of the pressure existing in the primary circuit (i.e in the vessel) compared to the rated value. The regulation of the heating system of the second vessel or "intermediate reserve vessel" depends on the value of the inside temperature, independently of the pressure value.

The rated value of this temperature is chosen in relation with the rated value of the pressure inside the primary circuit (reactor vessel) so that the sprinkler pulverization of this water in the pressurizer vapor phase does not lead to any pressure variation.

Figure 4:
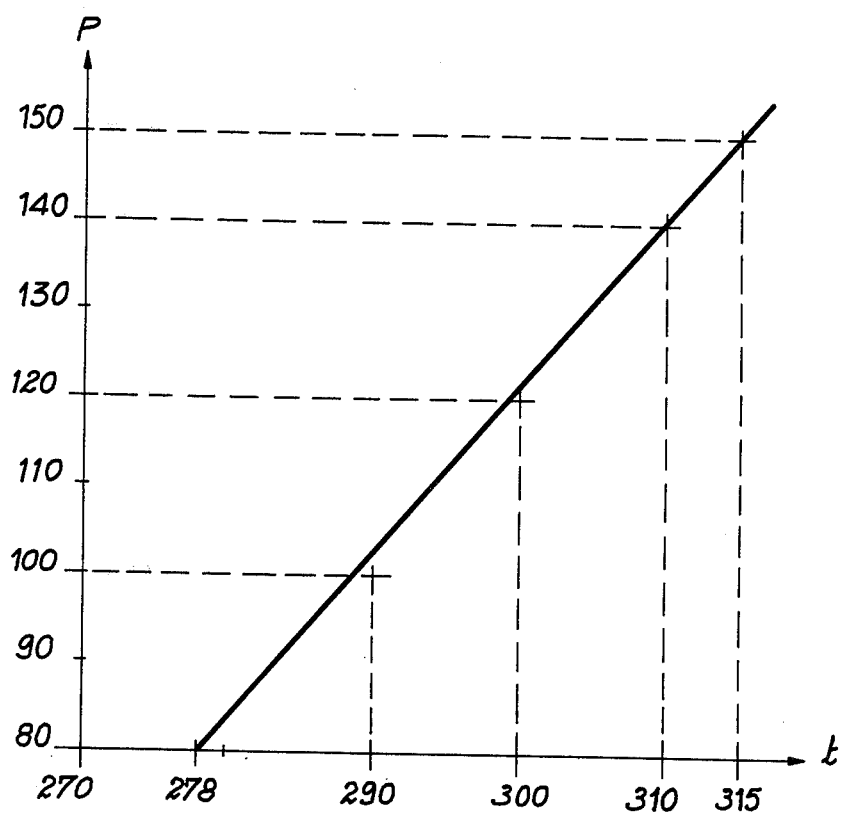

On the attached FIG. 4, the pressure value (P) in the primary circuit expressed in bars is represented compared to the temperature in the intermediate reserve vessel. It will be noted that it is a substantially straight line.

In order to homogenize the temperature in the intermediate reserve vessel, the permanent circulation flow must be such that it creates a turbulent hydraulic regime in the intermediate reserve vessel.

The invention will be better understood from reading the following description of several embodiments of the invention given in non-limitative manner.

The following description refers to the attached drawings wherein show:

FIG. 1 a first embodiment of the pressurizer with an intermediate reserve vessel.

Figures 2, 3:
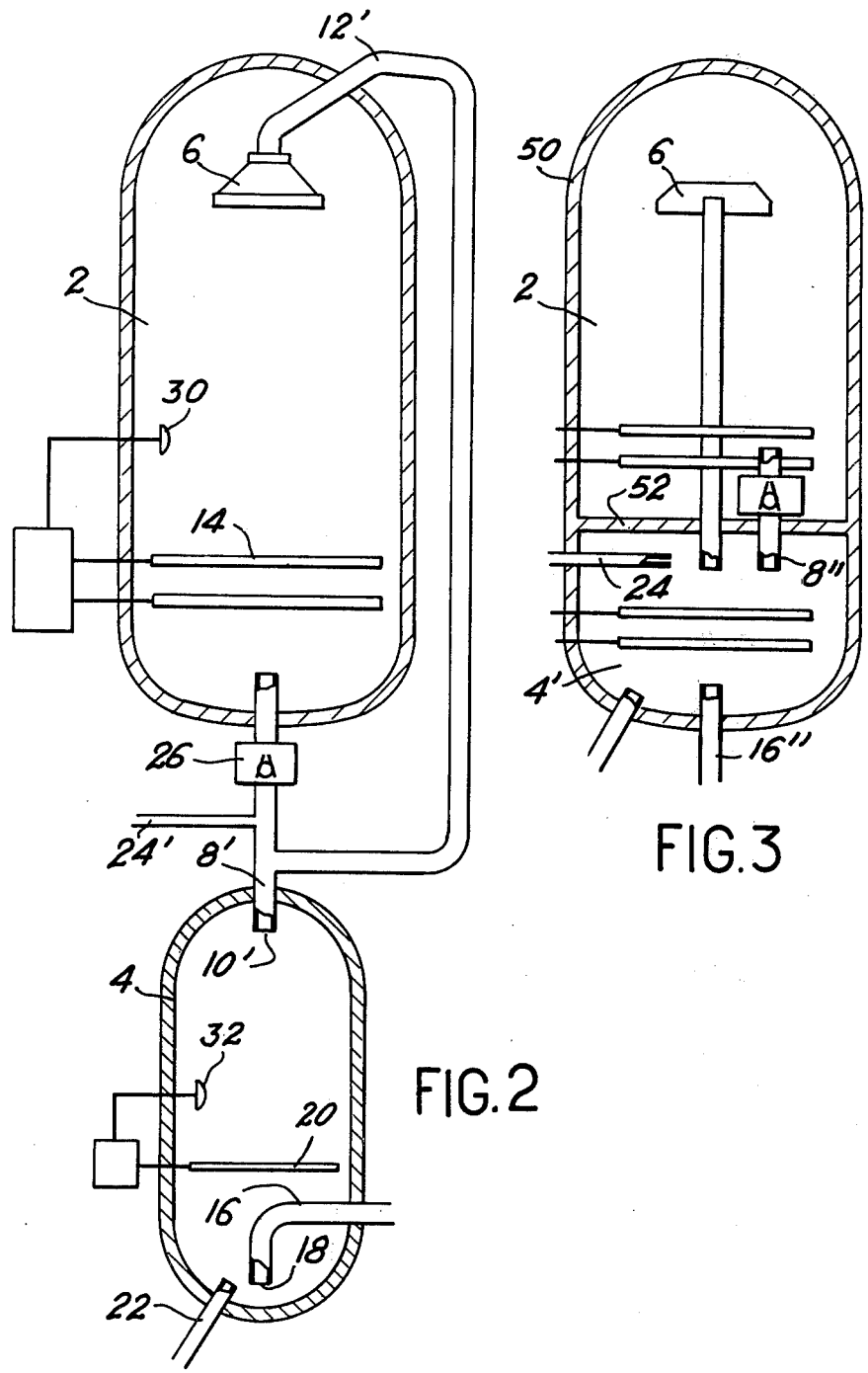

FIG. 2 a preferred variant of the same pressurizer, with an intermediate reserve vessel.

FIG. 3 an embodiment of a pressurizer with an integrated intermediate reserve vessel.

On the above described FIG. 4, a diagram shows the pressure P in the primary circuit in relation to the temperature ($t$) in the intermediate reserve vessel.

The installation has two separate compartments which, in the case of the embodiment shown in FIG. 1, comprise a first sealed enclosure 2 which constitutes the pressurizer and a second sealed enclosure 4 which constitutes the intermediate reserve vessel. The actual pressurizer 2 has internally a sprinkler system 3 located at the upper end thereof. This sprinkler system makes it possible to atomize water in the upper part of the pressurizer 2.

Pressurizer 2 also has a pipe 8 which tranverses its wall and issues into the lower area thereof. The second end 10 of pipe 8 passes through the intermediate temperature vessel 4 to issue towards the upper end thereof. The sprinkler 6 is connected to one of the ends of a second pipe 12, whose other end is connected to the first pipe 8 outside vessel 4. Pressurizer 2 also has internally and in the lower part thereof, a heating system 14, for example, insulated electrical resistors. Vessel 4 also has a third pipe 16 which issues externally of the wall of vessel 4 and therefore communicates with the inside of the reactor pressure resistance vessel and whereof the other end 18 issues into the lower part of vessel 4. For example, the first end of pipe 16 issues in an outlet primary pipe, i.e in a pipe directed towards a steam generator.

Vessel 4 also has a heating system 20 and a circuit means for causing the permanent circulation of the water in the vessel 4. As it has been said the circuit creates a turbulent hydraulic regime in the intermediate reserve vessel so as to uniformize the water temperature in the intermediate reserve vessel. The circuit means includes an inlet pipe 22 with an end extending into the vessel 4 and an outlet pipe 24 connected to the pipe 8. The outlet pipe 24 is adapted to take water from the pipe 8 and supply it to the circuit means which introduces the water into the vessel 4 through the inlet pipe 22. In this way, the circuit means provides for a permanent circulation of the liquid therein. Moreover, pipe 8 is provided with a non-return valve 26 which only permits the circulation of water from the pressurizer 2 towards the intermediate temperature vessel 4. Pipe 12 could also be equipped with a non-return valve which would only permit water to circulate in the direction from vessel 4 to pressurizer 2. However, a special arragement of the two compartments and the pipes makes it possible to avoid such a second valve. Thus, pipes 8 and 12 permit a unidirectional circulation of liquids.

Under static operating conditions, neither extrusion nor intrusion takes place. The water level is established at level A in pipe 12 of sprinkler system 6. Under dynamic operating conditions, in the case of an extrusion, there is a drop in the level in pressurizer 2 and the water reaches level B. The charge losses in pipe 8 cause, depending on their size, a water level in pipe 12 which is below level B, for example level C. To prevent any exhausting of steam in the case of maximum extrusion, it is merely necessary to prevent the water level in pipe 12 from dropping below level D corresponding to the horizontal portion 28 of pipe 8. Thus, with the knowledge of the minimum water level in the pressurizer, for example level B and the maximum size of the charges losses in pipe 8 (for example difference in level between the B and C) it is merely necessary for BC to always be below BD, D being the level defined hereinbefore.

Enclosures 2 and 4 contain sensors 30 (pressure) and 32 (temperature) which control the electrical supply 30' and 32' of heating systems 14 and 20.

FIG. 2 shows a variant of the embodiment in which the conditions defined hereinbefore are automatically realised.

In this drawings, the same parts as in FIG. 1 are given the same reference numerals, whilst equivalent parts to those referred to in FIG. 1 carry the same reference numerals with an apostrophe. Thus, pipe 8' is equivalent to pipe 8 which connects the upper end of vessel 4 to the lower end of pressurizer 2. In the same way, pipe 12' is equivalent to pipe 12 which supplies the sprinkler system 6. In this configuration, the pressurizer 2 is located above vessel 4. In this case, it can be seen that there is never any exhaustion of steam from pressurizer 2 to vessel 4. Thus, as pressurizer 2 never empties under normal operating conditions, height BC is always below BD, BD and D having the same meanings as in the description relative to FIG. 1.

FIG. 3 shows an integrated construction of the pressurizer with an intermediate temperature vessel. In this embodiment, the apparatus comprises a single enclosure 50 embodying the two compartments 2' and 4'. These two compartments are separated by an inner horizontal partition 52, whereby upper compartment 2' serves as the actual pressurizer, whilst lower compartment 4' serves as the intermediate temperature vessel. Equivalent pipes to those described in FIGS. 1 and 2 are provided. More specifically, pipe 8" which connects the two compartments is equivalent to pipe 8. In the same way, pipe 12" which connects the sprinkler system 6 to the lower compartment 4' is equivalent to pipe 12. Finally, pipe 16" which links compartment 4', constituting the intermediate temperature vessel with the reactor vessel is strictly equivalent to pipe 16 in FIG. 1. The external enclosure may of course be separated in two compartments by a wall which is neither plane or horizontal. For example the compartment constituting the intermediate reserve vessel may be entirely set inside the compartment constituting the pressurizer proper. In any case, the separation has to be insulated. The intermediate reserve vessel may be cylindrical or toroidal.

The operation of the pressurizer will now be described, whilst envisaging the two main cases of operation. In these two cases, the starting phase is a phase under constant operating conditions, that is to say a phase in which the reactor operates at rated pressure and temperature. As an example, the conditions are as follows:

| In pressurizer 2 | Temperature : 333° C |
| | Pressure : 140 bars |
| In vessel 4 | Temperature : 309° C |
| | Pressure : 140 bars |
| In the reactor vessel | Temperature : 290° C |
| | Pressure : 140 bars |

In the following example, it is assumed that initially the reactor charge is increased and is then suddenly reduced.

In the increase phase of the reactor charge, the primary circuit water cools. There is then an extrusion of water from pressurizer 2 to reserve vessel 4 and from vessel 4 to the reactor vessel via pipe 16. More specifically, the temperature and pressure drop within the pressurizer 2. As from a certain pressure or temperature gradient, sensor 30 records said drop and starts up the heating system 14 of the pressurizer. As from this time, the pressure and temperature cease to drop and start to rise. In the intermediate vessel 4, the water at 333° C. from the pressurizer 2 heats the water contained in the latter. The permanent circulation through pipes 22 and 24 tends to decrease and then reduces the said heating.

The water returning to the reactor comes from the intermediate reserve vessel and is therefore at a lower temperature than if it came directly from the pressurizer (i.e 309° C. instead of 333° C.), which reduces the thermal stress.

In a second phase, a sudden reduction of the reactor charge is assumed:

The primary circuit water is heated. In the intermediate vessel 4, the "cold" primary water (temperature below 287° C.) enters the lower portion thereof. The temperature of the said vessel decreases and rapidly reaches it rated value under the combined action of this cold water and of the heating system. If the pressure and temperature in this vessel decrease further, the heating system 20 is put into operation by the temperature sensor 32 located in vessel 4. Under the action of this heating system, the water in this vessel returns to its rated values.

In the pressurizer there is an intrusion of water by sprinkling hot water from the reserve vessel via pipe 12. There is a rapid regeneration of pressure in the latter. In the latter up to the rated value under the action of the sprinkler water coming from the reserve vessel and of the heating system of the pressurizer. The heating system 14, which was put into operation during the extrusion phase is stopped thermostatically by sensor 30.

It will now be assumed that there is firstly a charge decrease phase after a phase of operation under constant conditions, this charge decrease being followed by an increase of the same amplitude.

During the reduction of the reactor charge, the primary water is heated and there is an intrusion of water into the reserve vessel via pipe 16. The primary water is "tepid", that is to say above 287° C., but the temperature is below that of the water in reserve vessel 4. Operation of the heating system 20 is therefore started and this leads to the heating of the water in reserve vessel 4. Pressurizer 2 is then sprinkled with water at 309° C. from the reserve vessel, so that neither the temperature nor the pressure of its water change. Thus, the sprinkler has a cooling action such that it maintains the pressure at its rated value in the pressurizer because the water of the intermediate reserve vessel is at the rated temperature. Now, it will be recalled that the rated temperature is determined by the rated pressure in the pressurizer. Even when all the water at 309° C. has been sprinkled into the pressurizer (this case occurs exceptionally because the volume of the intermediate reserve vessel is sufficient to prevent it from being emptied of its water in normal transients), the water from the reserve vessel is henceforth "cold" (between 287° and 309° C.) and the thermostatically controlled heating system 14 of the pressurizer 2 starts operating to maintain the temperature and pressure at their rated values.

In the second phase, the reactor charge is increased, so that it is under rated operating conditions. Water extrusion then occurs from the pressurizer to the reserve vessel, then from the reserve vessel to the primary circuits.

In the pressurizer, the heating systems maintains the temperature and pressure up to their rated values, i.e. 333° C. and 140 bars. The intermediate temperature vessel receives relatively hot water at between 309° and 333° C., so that the temperature roughly reassumes its rated values.

When the temperature exceeds 309° C., the heating system of the intermediate temperature vessel stops operating and the rated value is obtained through the permament circulation system. In the case of extrusion, it should be noted that it is particularly advantageous if the volume of water to be heated in the pressurizer is low, compared with what would have been the case without an intermediate reserve vessel.

It is finally pointed out that as a result of the apparatus according to the invention, the temperature variations of the water in both the enclosures are essentially divided by two, compared with what they would have been without the reserve vessel. They are respectively 24° and 19° C., instead of 43° C.

Such diminution in the temperature differences substantially reduces the induced thermal stress in the different components of the entire pressurization device.

What is claimed is:

1. Pressurization apparatus for a container containing a liquid whose temperature is liable to vary, characterized in that it comprises a first enclosure or "pressurizer" having a sprinkler system located in the upper parts thereof and a first heating system and a second enclosure or "intermediate reserve vessel" having a second heating system, whereby a first pipe connects the base of said reserve vessel with said container, whilst a second unidirectional pipe passes liquid from the lower part of said pressurizer towards the upper part of said reserve vessel and a third unidirectional pipe passes the said liquid from the upper part of the said reserve vessel to the said sprinkler system.

2. Apparatus according to claim 1, characterized in that the second pipe contains a non-return valve.

3. Apparatus according to claim 1, characterized in that the pressurizer is located above the reserve vessel.

4. Apparatus according to claim 1, characterized in that it comprises a single external enclosure divided into two compartments by a partition, the first compartment serving as the "pressurizer" and the second compartment serving as the "intermediate reserve vessel," the second and third pipes traversing the said partition.

5. Apparatus according to claim 4, characterized in that the reserve vessel is equipped with means for causing the permanent circulation of the liquid therein.

6. Apparatus according to claim 4, characterized in that the pressurizer is equipped with means for supplying the heating system when the internal pressure is below a given pressure and for stopping it when said pressure again rises above a given pressure and in that the said reserve vessel has means for supplying the second heating system when the temperature of the liquid contained therein is below a given temperature and for stopping it when the temperature rises to above a given temperature.

7. Apparatus according to claim 1, characterized in that the reserve vessel is equipped with means for causing the permanent circulation of the liquid therein.

8. Apparatus according to claim 1, characterized in that the pressurizer is equipped with means for supplying the heating system when the internal pressure is below a given pressure and for stopping it when said pressure again rises above a given pressure and in that the said reserve vessel has means for supplying the second heating system when the temperature of the liquid contained therein is below a given temperature and for stopping it when the temperature rises to above a given temperature.

* * * * *